United States Patent
Block et al.

(10) Patent No.: US 6,888,974 B2
(45) Date of Patent: May 3, 2005

(54) ON-CHIP OPTICAL SIGNAL ROUTING

(75) Inventors: Bruce A. Block, Portland, OR (US); Brandon C. Barnett, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/422,345

(22) Filed: Apr. 23, 2003

(65) Prior Publication Data

US 2004/0223681 A1 Nov. 11, 2004

(51) Int. Cl.[7] .............................. G02B 6/26; G02B 6/42
(52) U.S. Cl. ................... 385/15; 385/1; 385/2; 385/3; 385/8; 385/14; 385/39; 385/40; 385/41; 385/42; 385/48; 385/88; 385/89
(58) Field of Search ..................... 385/1–3, 8–14, 385/15, 129, 131, 39–42, 48, 88–89, 16–19, 24, 37; 359/341, 124, 127, 130; 257/700; 438/31

(56) References Cited

U.S. PATENT DOCUMENTS

| | | | | |
|---|---|---|---|---|
| 6,052,495 A | * | 4/2000 | Little et al. | 385/2 |
| 6,192,167 B1 | * | 2/2001 | Kissa et al. | 385/3 |
| 6,339,663 B1 | * | 1/2002 | Leng et al. | 385/24 |
| 6,411,752 B1 | * | 6/2002 | Little et al. | 385/17 |
| 2004/0184701 A1 | * | 9/2004 | Barnett et al. | 385/14 |

* cited by examiner

*Primary Examiner*—Brian Healy
*Assistant Examiner*—Ryan Lepisto
(74) *Attorney, Agent, or Firm*—Fish & Richardson P.C.

(57) ABSTRACT

A microchip may include an optical signal routing system. The optical routing system may include a distribution waveguide coupled to a light source and signaling waveguides interconnecting source and destination locations. A directional coupler may be used to couple and modulate light from the distribution waveguide to a signaling waveguide at a source location. A photodetector may be used to convert light signals from the source location into electrical signals at the destination.

36 Claims, 4 Drawing Sheets

ON-CHIP OPTICAL SIGNAL ROUTING

BACKGROUND

Integrated circuits (ICs) may include signal lines which traverse a large portion of the chip. For example, global signal lines may span nearly the entire length of the chip. Electrical repeaters may be included in a long signal line to compensate for the lossy nature of the electrical lines. However, the repeaters may increase the signal delay and power consumption of the chip. These problems may worsen at higher speeds.

Electrical lines may be sensitive to electromagnetic interference (EMI), and care must taken to properly shield the lines. Since long signal lines are typically placed in the upper metallization layers, via blockage may occur when the repeaters are connected to the transmission line. The EMI interference and via blockage may complicate the design of the global signal lines.

DETAILED DESCRIPTION

Figure 1:
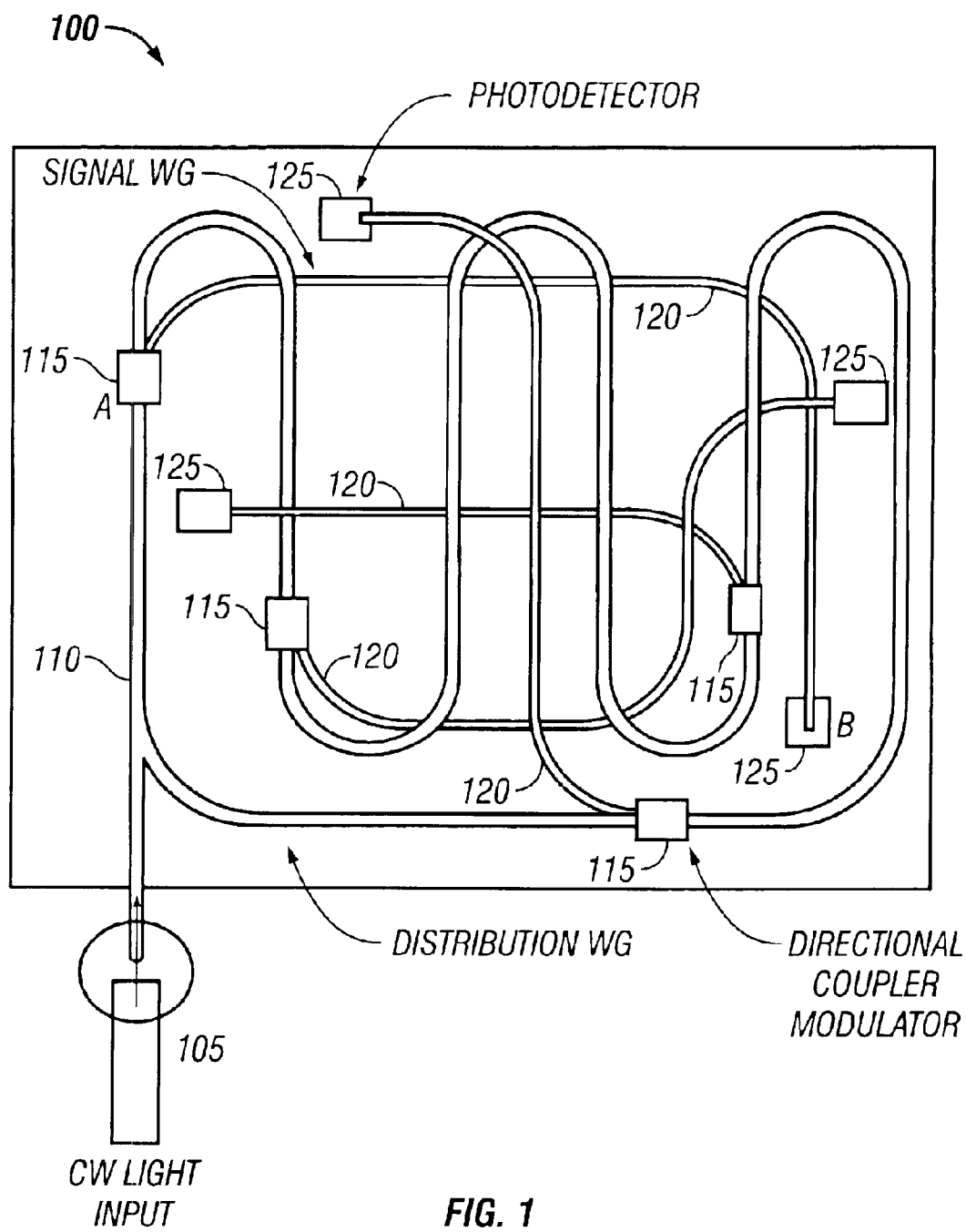
FIG. 1 is a block diagram of a microchip including an on-chip optical signal routing system.

FIG. 1 shows a microchip 100 including an on-chip optical signal routing system. The on-chip optical signal routing system may transfer signals over relatively large distances on the chip using modulated light beams. In typical chips, electrical signals may be carried by relatively long electrical signal lines, e.g., global signal lines. Long electrical lines typically include electrical repeaters at intervals to compensate for signal attenuation due to the lossy nature of the electrical lines. However, various problems may be associated with the inclusion of repeaters, including, for example, increased signal delay and power consumption, electromagnetic interference (EMI), and via blockage between metallization layers in the chip.

The on-chip optical routing system may include a continuous wave (CW) light source 105 coupled to a distribution waveguide 110. The distribution waveguide 110 may act as a "light pipe" which provides a reservoir of photons for on-chip signaling. The distributed waveguide is distributed across the chip. As shown in FIG. 1, the distribution waveguide 110 may form a winding with an end that converges back into itself to form a closed ring. This closed loop configuration may minimize power fluctuations in the ring. Alternatively, the distributed waveguide 110 may be distributed across the chip by successive splitting and fanning out of the distribution waveguide into branches.

Figure 2:
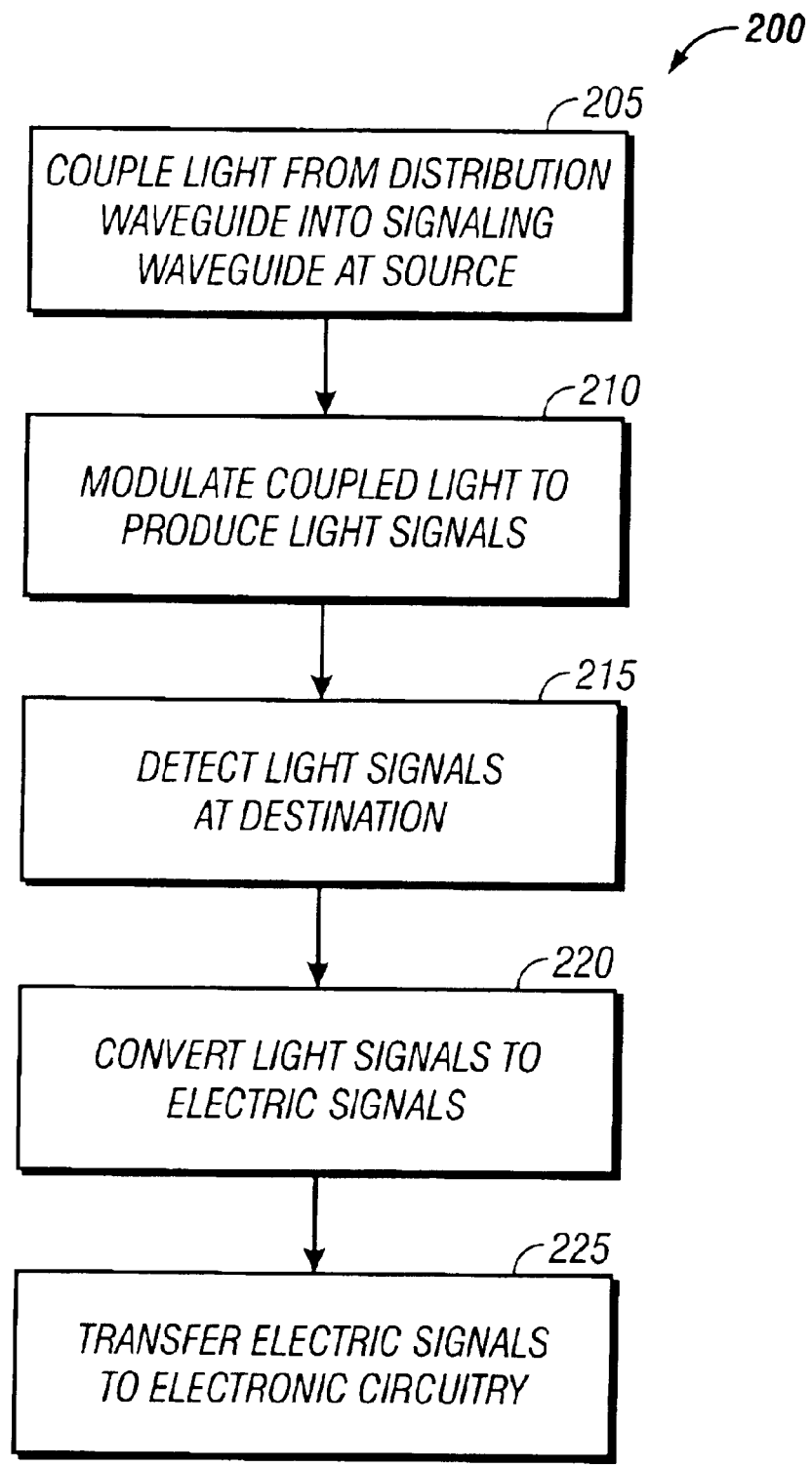
FIG. 2 is a flowchart describing an optical signal routing operation.

FIG. 2 is a flowchart describing an optical signal routing operation 200. Electrically controlled modulated taps 115 may be provided at origin points (e.g., Point A) to tap light off of the distribution waveguide 110 (block 205) and modulate the tapped light. The modulated taps may be activated by applying a control voltage. When the voltage is applied, some of the light in the distribution waveguide may be transferred out of the distribution waveguide and into a signaling waveguide 120. When the voltage is removed, the light is once again blocked from being transferred into the signal waveguide. Pulses of light can be made to travel down the signal waveguide by successively applying the control voltage to the modulated tap, i.e., turning the modulated tap on and off to produce a desired signal pattern (block 210). These pulses may then be detected at a destination point (e.g., Point B) at the end of the signaling waveguide 120 by a photodetector or phototransistor 125 (block 215), which may convert the light signals back to electrical signals (block 220). The electrical signals may be transferred to electronic circuitry in the microchip relatively near the destination point (block 225).

Figure 3:
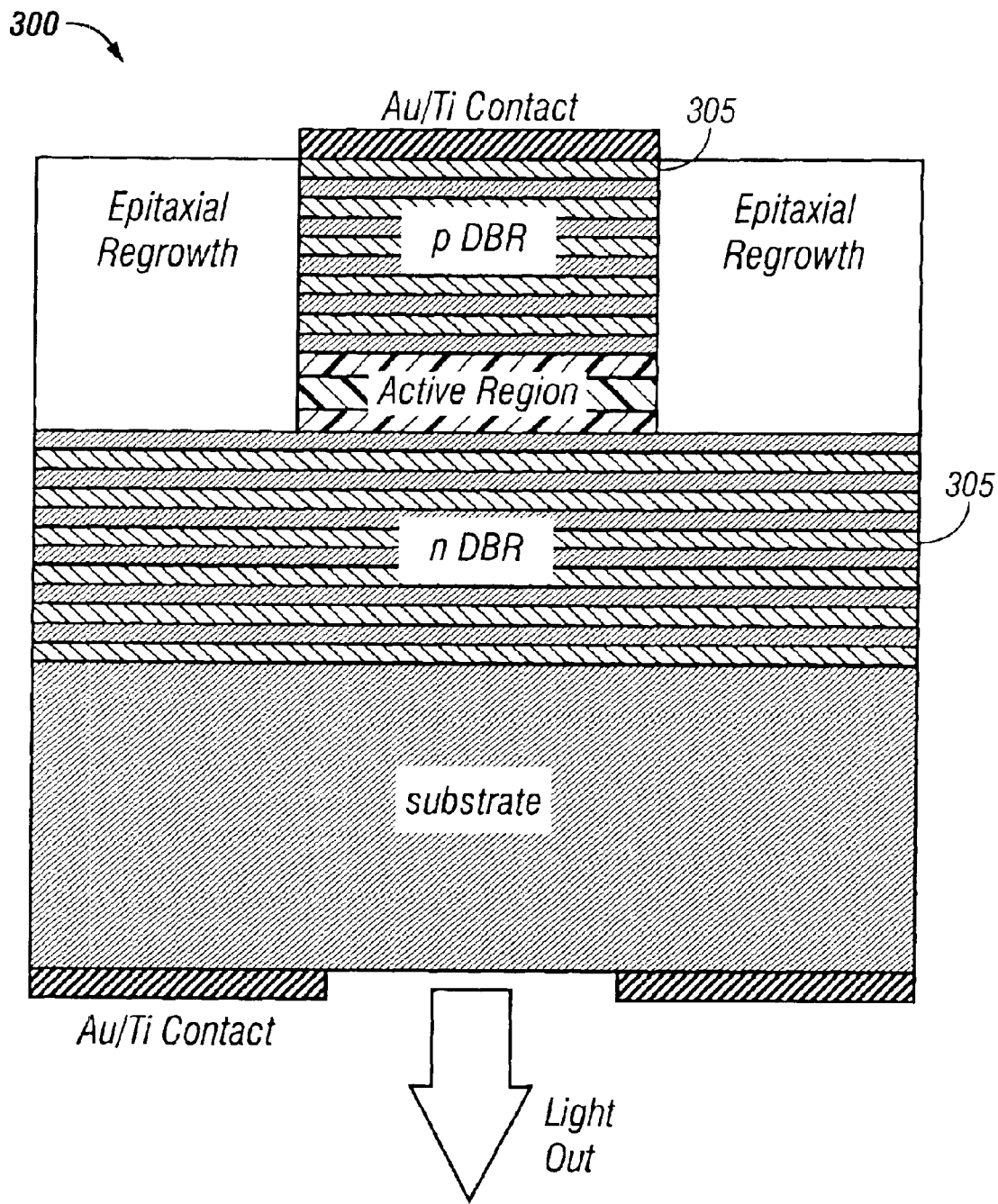
FIG. 3 is a sectional view of a vertical cavity surface emitting laser (VCSEL).

The CW light source 115 may be, for example, an optical fiber, edge-emitting laser, vertical cavity surface emitting laser (VCSEL), or other semiconductor laser. VCSELs may be desirable for their uniform, single mode beam profiles, which may be more easily coupled to optical fibers. The cavity length of VCSELs may be very short, e.g., one to three wavelengths of the emitted light. As a result, a photon may have a small chance of triggering a stimulated emission event in a single pass of the cavity at low carrier densities. Consequently, VCSELs may require highly reflective mirrors to be efficient. The reflectivity of the facets in edge-emitting lasers may be about 30%, whereas, for VCSELs, the reflectivity required for low threshold currents may be greater than 99%. Achieving such a high reflectivity with metallic mirrors may be impractical. Instead, many VCSELs use Distributed Bragg Reflectors (DBRs). FIG. 3 shows an exemplary VCSEL structure 300. DBRs 305 in the laser structure may be formed by laying down alternating layers of semiconductor or dielectric materials with different refractive indexes.

Figure 4:
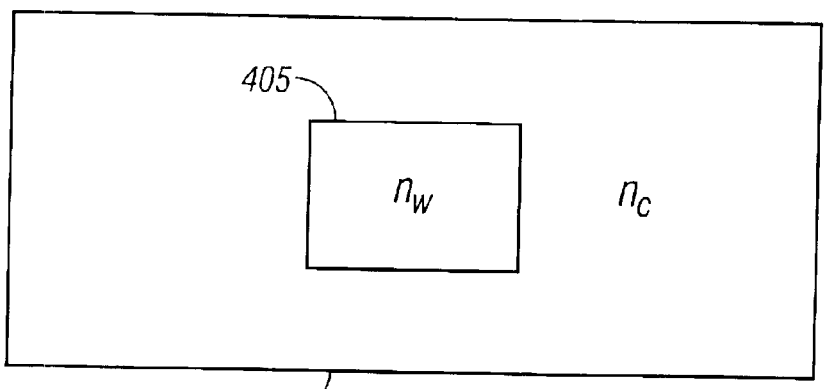
FIG. 4 is a sectional view of an integrated waveguide structure.
Figure 5:
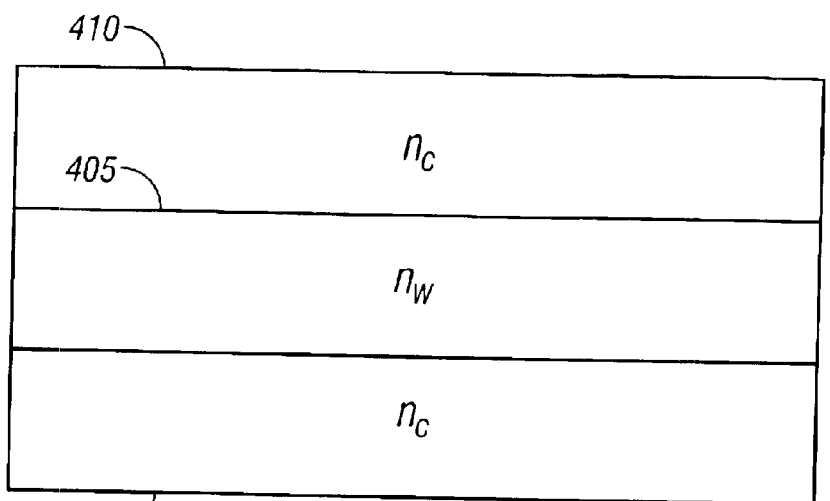
FIG. 5 is a plan view of the integrated waveguide structure.

The distribution waveguide 110 and the signaling waveguides 120 may be integrated in the chip. A cross section and a top view of an integrated waveguide are shown in FIGS. 4 and 5, respectively. The waveguide may include an optically guiding core 405 of a material with refractive index $n_w$ surrounded by a cladding material 410 with a different index of refraction, $n_c$. The high contrast of the refractive index between the two materials provides nearly complete internal reflection in the core, thereby confining a lightwave to the waveguide 405.

Silicon oxide ($SiO_2$) ($n_c \approx 1.5$) may be used as the cladding material. The waveguide material may be selected from, e.g., silicon nitride ($Si_3N_4$) ($n_w \approx 2$), silicon (Si) ($n_w \approx 3$), and silicon oxynitride (SiON) ($n_w \approx 1.55$). Silicon oxynitride may offer design flexibility because its refractive index may be varied by changing the content of nitrogen.

The waveguides may be classified as high index contrast (HIC) or low index contrast (LIC) depending on the difference in the indices of refraction between the core and the cladding. In a HIC waveguide, core and cladding materials are chosen to have very different indices of refraction, e.g., $n_w \approx 2.0$ and $n_c \approx 1.5$. This, in turn, may cause the electric field to be strongly confined within the core, substantially reducing radiation loss for sharp bends (e.g., less than about 50 microns) and allowing smaller structures to be produced. The LIC waveguides may have a smaller contrast between the core and cladding indices of refraction, e.g., $n_w \approx 1.6$ and $n_c \approx 1.5$. The distribution waveguide may be a relatively large LIC waveguide with bends having relatively large radius of curvatures (e.g., about 1 mm). The signaling waveguides 120 may be smaller HIC waveguides, which may include relatively sharp bends.

Driver circuits 602 in the microchip 100 may drive the modulated taps to control and modulate the CW light from the distribution waveguide 110 for on-chip signaling. The modulated taps 115 may work at high frequency to both tap light from the distribution waveguide 110 and into signaling waveguides 120 and encode data by modulating the tap.

The modulated taps 115 may couple light from the distribution waveguide 110 into the signaling waveguides 120. "Mode" refers to the solution of Maxwell's wave equation satisfying the boundary conditions of a waveguide, thus forming a unique pattern of standing wave in the radial direction on the cross section of the waveguide. A mode is characterized by its propagation constant (eigenvalue of the wave equation). Evanescent coupling may occur when the evanescent tails of each waveguide overlap to such a degree that there are two possible solutions for mode propagation in the two waveguide structure. These may be referred to as the "Supermodes" or "Eigenmodes." The two solutions may have symmetric and antisymmetric energy distributions and differing propagation constant values. As the relative phases of the modes change, the energy is shared between the two waveguides and at matching and mismatched phase, the energy is alternately maximized in each waveguide, i.e., the energy beats back and forth between the waveguides, dependent on the waveguide separation and the interaction length.

Figure 6:
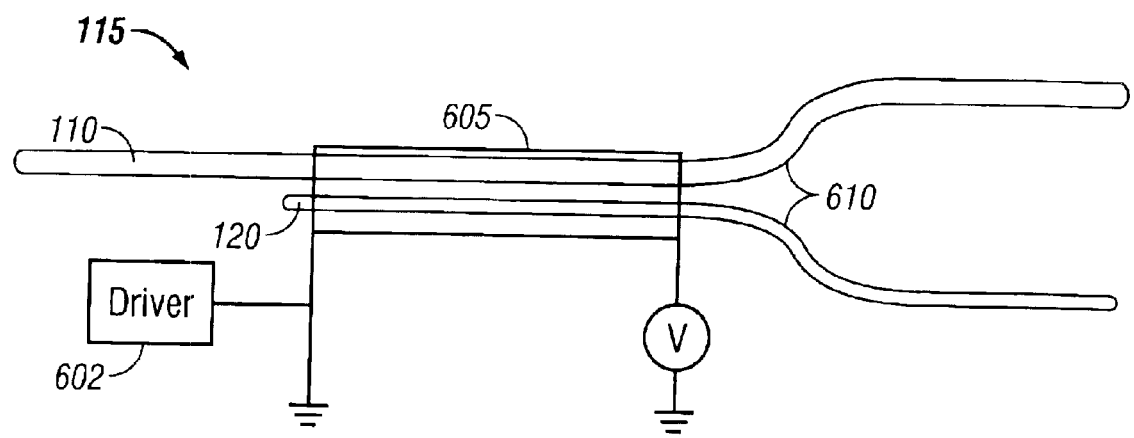
FIG. 6 is a schematic diagram of a directional coupler.

As shown in FIG. 6, a modulated tap 115 may include two side-by-side waveguides (e.g., distribution waveguide 110 and a signaling waveguide 120) separated by a few tenths of micrometers to a few micrometers. Voltage applied by an electrode 605 may cause a change in the evanescent coupling efficiency between waveguide 110 and waveguide 120. In the off state the light goes through the device unaltered, i.e., no light is tapped from the distribution waveguide 110. When a high frequency signal voltage is applied, the intensities at the output ports 610 are determined by either modulation of the phase mismatch, $\Delta\beta$, or the coupling coefficient K. Thus, change of voltage by an amount $V_s$ switches an input signal from one output port to the other. The now modulated light is transferred to the signaling waveguide and is sent off-chip. Only a portion of the light in the distribution waveguide 110 may be needed, e.g., about 5%. Since all of the light is not being switched to the signaling waveguide 120, a full $\Pi$ phase shift may not be required.

The integrated waveguides may be fabricated on a silicon layer in the chip. For example, a lower cladding layer may be formed by thermal oxidation of the silicon layer. The core may be deposited by plasma enhanced chemical vapor deposition (PECVD). A waveguide pattern may be defined by optical contact lithography and transferred to the core layer by reactive ion etching (RIE). The etched waveguide pattern may be overgrown with PECVD silicon oxide as the upper cladding layer.

The optical components may be incorporated in optics layer(s), which may be separate from the layers containing the electronic circuitry components of the microprocessor. For example, the optical layer(s) may be formed on the top metallization layer of the chip during backend processing. In this case, a lower cladding layer for the integrated waveguides may be formed by growing a silicon oxide layer using chemical vapor deposition (CVD) or sputtering techniques.

The use of optical signal lines (waveguides) over relatively large distances may have several advantages over electrical signal lines. Signal delay and power dissipations may be reduced by eliminating electrical repeaters. Die area and via blockage may also be reduced by eliminating the need for repeaters on signal lines. Furthermore, signal waveguides may intersect without significant crosstalk, thereby simplifying layout design.

A number of embodiments have been described. Nevertheless, it will be understood that various modifications may be made without departing from the spirit and scope of the invention. Accordingly, other embodiments are within the scope of the following claims.

What is claimed is:

1. An apparatus comprising:
   a microchip including
   a distribution waveguide adapted to be coupled to a light source,
   a signaling waveguide having an end proximate a portion of the distribution waveguide,
   a modulated tap to couple light from the distribution waveguide into the signaling waveguide and modulate the light into light signals
   a plurality of layers including electronic circuitry, the circuitry including a driver operative to drive the modulated tap, and
   an interconnect between the driver and the modulated tap.

2. The apparatus of claim 1, further comprising a converter coupled to another end of the signaling waveguide and operative to convert the light signals into electrical signals.

3. The apparatus of claim 2, wherein the microchip further comprises:
   a plurality of layers including electronic circuitry, the circuitry; and
   an interconnect between the converter and the electronic circuitry in the microchip.

4. The apparatus of claim 2, wherein the converter comprises a photodetector.

5. The apparatus of claim 2, wherein the converter comprises a phototransistor.

6. The apparatus of claim 1, wherein the light source comprises a single mode light source.

7. The apparatus of claim 1, wherein the light source comprises a semiconductor laser.

8. The apparatus of claim 1, wherein the distribution waveguide comprises a low index contrast waveguide and the signaling waveguide comprises a high index contrast waveguide.

9. The apparatus of claim 1, wherein the waveguides comprise silicon waveguides.

10. The apparatus of claim 9, wherein the waveguides comprise a core including silicon and a silica cladding layer.

11. An apparatus comprising:
    a microchip including
    a distribution waveguide adapted to be coupled to a light source,
    a signaling waveguide having an end proximate a portion of the distribution waveguide, and
    a modulated tap to couple light from the distribution waveguide into the signaling waveguide and modulate the light into light signals, wherein the modulated tap comprises a directional coupler.

12. The apparatus of claim 11, further comprising a converter coupled to another end of the signaling waveguide and operative to convert the light signals into electrical signals.

13. The apparatus of claim 12, wherein the microchip further comprises:

a plurality of layers including electronic circuitry, the circuitry; and an interconnect between the converter and the electronic circuitry in the microchip.

14. The apparatus of claim 12, wherein the converter comprises a photodetector.

15. The apparatus of claim 12, wherein the converter comprises a phototransistor.

16. The apparatus of claim 11, wherein the light source comprises a single mode light source.

17. The apparatus of claim 11, wherein the light source comprises a semiconductor laser.

18. The apparatus of claim 11, wherein the distribution waveguide comprises a low index contrast waveguide and the signaling waveguide comprises a high index contrast waveguide.

19. The apparatus of claim 11, wherein the waveguides comprise silicon waveguides.

20. The apparatus of claim 19, wherein the waveguides comprise a core including silicon and a silica cladding layer.

21. A method comprising:

coupling light from a distribution waveguide on a microchip to a signaling waveguide in the microchip;

modulating light in the signaling waveguide to produce light signals, wherein said modulating comprises coupling and decoupling light from the distribution waveguide to the signaling waveguide; and converting the light signals to electrical signals at a destination on the microchip.

22. The method of claim 21, wherein said modulating comprises modulating the light in response to electrical signals.

23. The method of claim 21, further comprising transferring the electrical signals to electronic circuitry in the microchip.

24. A method comprising:

coupling light from a distribution waveguide on a microchip to a signaling waveguide in the microchip, wherein said coupling comprises coupling light by an evanescent coupling effect;

modulating light in the signaling waveguide to produce light signals; and converting the light signals to electrical signals at a destination on the microchip.

25. The method of claim 24, wherein said modulating comprises modulating the light in response to electrical signals.

26. The method of claim 24, further comprising transferring the electrical signals to electronic circuitry in the microchip.

27. A method comprising:

coupling light from a distribution waveguide on a microchip to a signaling waveguide in the microchip, wherein said coupling comprises providing a control voltage to a directional coupler at a junction between the distribution waveguide and the signaling waveguide;

modulating light in the signaling waveguide to produce light signals; and converting the light signals to electrical signals at a destination on the microchip.

28. The method of claim 27, wherein said modulating comprises modulating the light in response to electrical signals.

29. The method of claim 27, further comprising transferring the electrical signals to electronic circuitry in the microchip.

30. A system comprising:

a light source; and a microchip including an integrated distribution waveguide coupled to the light source, a source location on the distribution waveguide including a modulated tap to modulate at least a portion of the light in the distribution waveguide into light signals, a destination location including a converter to convert the light signals into electrical signals, an integrated signaling waveguide interconnecting the source location and the destination location, and a plurality of layers including electronic circuitry, the circuitry including a driver operative to drive the modulated tap, and an interconnect between the driver and the modulated tap.

31. The system of claim 30, wherein the microchip further comprises:

a plurality of layers including electronic circuitry, the circuitry; and an interconnect between the converter and the electronic circuitry in the microchip.

32. The system of claim 30, wherein the converter comprises a photodetector.

33. The system of claim 30, wherein the converter comprises a phototransistor.

34. The system of claim 30, wherein the light source comprises a single mode light source.

35. The system of claim 30, wherein the distribution waveguide comprises a low index contrast waveguide and the signaling waveguide comprises a high index contrast waveguide.

36. The system of claim 30, wherein the waveguides comprise silicon waveguides.

* * * * *